J. H. BURKE.
CUTTER HEAD.
APPLICATION FILED MAR. 13, 1912.
1,033,380.
Patented July 23, 1912.
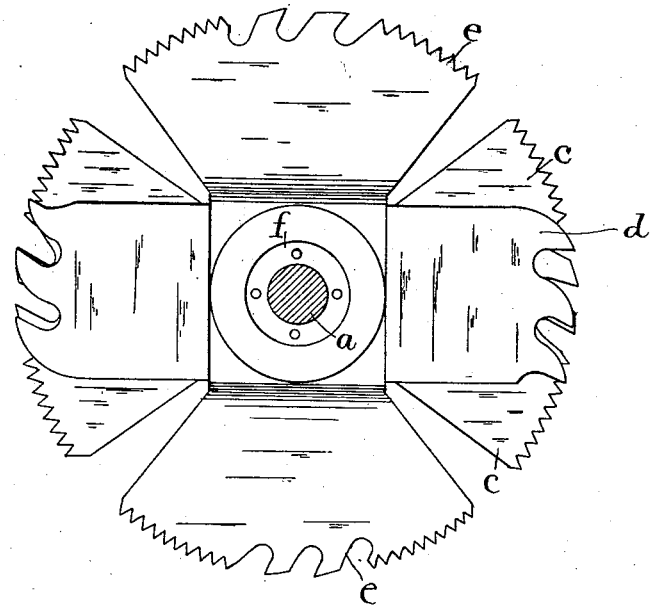
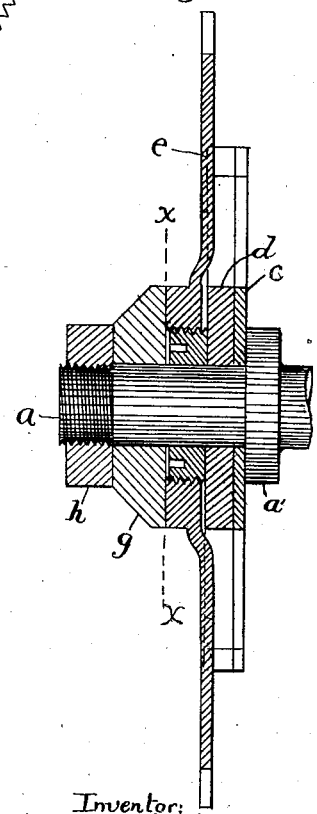

UNITED STATES PATENT OFFICE.

JOSEPH H. BURKE, OF PORTLAND, MAINE, ASSIGNOR TO THE BURKE CO., OF PORTLAND, MAINE, A CORPORATION OF MAINE.

CUTTER-HEAD.

1,033,380. Specification of Letters Patent. Patented July 23, 1912.

Application filed March 13, 1912. Serial No. 683,553.

*To all whom it may concern:*

Be it known that I, JOSEPH H. BURKE, of Portland, in the county of Cumberland and State of Maine, have invented certain new and useful Improvements in Cutter-Heads, of which the following is a specification.

My invention relates to a cutter head and it relates particularly to an improved construction of the cutter head shown and described in my United States Letters Patent dated Nov. 1, 1910, No. 974,234. In that patent I showed and described a cutter head made up of an arbor on which was a pair of segmental cutter blades, that is, blades having opposite toothed cutting edges each occupying a segment of a circle approximately 90 degrees each. One of the cutter blades was a flat blade and the other was bent or offset so that when the two were placed face to face on the arbor their cutting edges would travel normally in the same plane. In this cutter head the offset blade was held in a fixed position next to the collar and the flat blade was made adjustable toward and from the offset blade by means of a screw threaded bushing which was contained in a screw threaded opening in the center of the flat blade. By means of this construction I was able to cut grooves of any width ranging from the thickness of a single blade up to double such thickness by moving the flat blade in or out so that the path of its cutting edges overlapped the path of the cutting edges of the offset blade more or less. Thus at the inner position both paths were exactly in line and in the outer position they ran side by side with no space between them. This arrangement answered every purpose so long as I only wanted a groove within the limits spoken of, but if I wanted a wider groove there was no practical way of making it while getting the advantage of the fine adjustment which the movable blade otherwise gave me. If an extra blade was inserted between the two blades my flat movable blade came against the flat inserted blade which latter overlapped the offset blade. Thus when I attempted to move my flat blade I formed a space between it and the auxiliary flat blade and while I could build up the cutter head to form any standard groove, I lost the benefit of the fine adjustment which I had in narrow grooves using the two original blades. This difficulty I found could be remedied by reversing the arrangement of my blades and making the flat one the fixed blade and the offset one the movable blade. When this was done I could insert any number of auxiliary blades and always be able to vary the width of the groove an amount equal to the thickness of the offset blade as will be hereafter more clearly shown.

I have illustrated my invention by means of the accompanying drawing, in which is shown an improved cutter head constructed according to my present invention and including one auxiliary cutter blade.

In the drawing, Figure 1 is a section on the line $x$ $x$ of Fig. 2, and Fig. 2 is a central vertical section on Fig. 1.

The arbor $a$ is provided with the usual flange $a'$ and one or more of the fixed segmental cutter blades are slipped onto the arbor and held by friction against the flange $a'$. As here shown, the regular fixed cutter blade $c$ rests against the flange $a'$. It has expanded ends and a contracted center with suitable teeth on the segmental ends and it is shown with a flat or plane surface throughout. An auxiliary cutter blade of suitable thickness is slipped on the arbor next to the blade $c$. It is so formed that its teeth will travel in a path which will supplement the teeth of the blade $c$ so that the two will cut a single groove. As many of these auxiliary cutter blades are used as are necessary to make the width of the groove desired. Limited variations in the width of the groove are produced by a movable cutter blade with an offset so that its cutting edges may travel in the same path as those of the adjacent fixed cutter blade. As here shown, the cutter blade $e$ is bent or offset so that its cutting edges will run normally in the path of the cutting edges of the auxiliary cutter blade $d$. When at its inner position it runs entirely in the path of the cutting edges of the cutter $d$ and as it is moved outward it overlaps the cutter blade $d$ less and less increasing the width of the groove cut by the cutters $c$ and $d$ until at its outer position its whole thickness is added to the thickness of the other blades. Thus if the blades $c$ and $d$ aggregate $\frac{1}{2}$ inch in thickness and the blade $e$ is $\frac{1}{8}$ inch, the groove may be varied from $\frac{1}{2}$ inch when the blade $e$ is in its inner position to $\frac{5}{8}$ inch when at its outer position.

The adjustment of the blade $e$ is effected by means of the screw threaded bushing $f$ which fits a screw threaded opening in the center of the blade $e$. A collar $g$ and nut $h$ secure the parts together.

By the arrangement here shown, it is evident that the movable blade may be used in conjunction with the fixed blade $c$ alone or with any number of auxiliary blades. I thus get in my present invention, a cutter head which may not only be varied according to the thickness of the two original overlapping blades but I am enabled to build up the head to any desired thickness varying the exact width of the produced groove within the limits of the thickness of the offset blade which would commonly be $\frac{1}{8}$ inch.

My present cutter head thus has a far greater range of usefulness than my former device which had a very limited range of adjustment.

I claim;

1. In a cutter head, the combination of an arbor, a fixed cutter blade on said arbor, said cutter having opposite segmental cutting edges and a movable cutter blade on said arbor bent or offset so that its cutting edges may travel in the same path as the cutting edges of said fixed cutter blade, and means for adjusting said movable cutter blade away from and toward said fixed cutter blade.

2. In a cutter head, the combination of an arbor, a plurality of fixed cutter blades on said arbor, the outer blade being segmental, said blades being formed to cut a continuous groove, a movable segmental cutting blade on said arbor bent or offset so that its cutting edges may travel in the path of the cutting edges of the adjacent fixed cutter blade, and means for adjusting said movable cutter blade from and toward said adjacent fixed cutter blade.

3. In a cutter head the combination of an arbor, a flat segmental cutter blade on said arbor, a movable cutter blade on said arbor bent or offset so that its cutting edges may travel in the same path as the cutting edges of said flat cutter blade and means for adjusting said movable cutter blade from and toward said flat cutter blade.

4. In a cutter head, the combination of an arbor, a flat segmental cutter blade on said arbor, a movable cutter on said arbor bent or offset so that its cutting edges may travel in the same path as the cutting edges of said flat cutter blade, and having a central screw threaded opening and a screw threaded bushing in said opening adapted to impinge on said flat cutter blade and clamping means for securing the parts in place.

5. In a cutter head, the combination of an arbor, a plurality of fixed cutter blades on said arbor formed to travel in the same groove, the outer blade being segmental, a movable segmental cutter blade on said arbor, said movable cutter blade and its adjacent fixed cutter blade being so formed that their cutting edges may travel in the same plane and means for adjusting said movable cutter blade from and toward the fixed blade.

In testimony whereof I have affixed my signature, in presence of two witnesses.

JOSEPH H. BURKE.

Witnesses:
S. W. BATES,
C. B. CREIGHTON.